Dec. 1, 1970 — G. KLEE — 3,543,584
REGULATING SYSTEMS
Filed Nov. 25, 1968 — 3 Sheets-Sheet 1

Inventor
Gerhard Klee
By Watson, Cole, Grindle & Watson
Attys.

Dec. 1, 1970  G. KLEE  3,543,584
REGULATING SYSTEMS
Filed Nov. 25, 1968  3 Sheets-Sheet 3

Inventor
Gerhard Klee
By
Watson, Cole, Grindle & Watson
Attys.

United States Patent Office 3,543,584
Patented Dec. 1, 1970

3,543,584
REGULATING SYSTEMS
Gerhard Klee, Am Fuchshohl 104, Frankfurt
am Main-Ginnheim, Germany
Continuation-in-part of application Ser. No. 508,305,
Nov. 17, 1965. This application Nov. 25, 1968, Ser.
No. 778,742
Claims priority, application Germany, Nov. 18, 1964,
S 94,243
Int. Cl. G01l 7/00; G01d 5/46
U.S. Cl. 73—388                                    7 Claims

ABSTRACT OF THE DISCLOSURE

A regulator system has a measuring instrument with a dial on a shaft within a housing. A first transducer is behind the dial for transducing a signal physically transmitted from outside the housing into rotation of the shaft. A hand fixed on the shaft rotates and in cooperation with a scale on the dial gives a reading. A regulator unit is detachably mounted by a mounting frame in front of the dial. A coupling in front of the regulator unit makes contact with the hand of the measuring instrument. The coupling is supported so that it can rotate substantially coaxially in front of the dial coaxially with the shaft. As the shaft rotates a second transducer produces a pneumatic output signal in accordance with rotation of the shaft for transmission to a load.

---

The present application is a continuation-in-part of my application Ser. No. 508,305, filed Nov. 17, 1965, now abandoned.

The present invention relates to regulating arrangements and more particularly to such arrangements using an indicator gage responsive to the output quantity of the controlled object.

One particular object of the present invention is to provide a regulator unit which can be used in conjunction with any pressure, temperature or like gage of standard dimensions so that the regulator unit responds to the position of the hand of the gage.

Specifically the invention may be defined as comprising, in combination:

(a) A measuring instrument with a dial, a housing, a shaft extending along through the center of the dial, first transducing means behind the dial for transducing a signal physically transmitted from outside the housing into rotation of the shaft, and a hand fixed on the shaft for cooperation with a scale in giving a reading, and (b) A regulator unit, detachable mounting means such as a mounting frame holding the unit in front of the dial, a coupling for making contact with the hand of the instrument, means supporting the coupling so that it can rotate substantially coaxially in front of the dial coaxially with the shaft, and a second transducing means for producing a pneumatic output signal in accordance with rotation of the shaft for transmission to a load, a duct for supplying compressed power air, and a duct for conveying pneumatic output signals produced by the regulator unit.

Preferably the second transducing means comprising a pneumatic amplifier, a vane which is arranged to be rotated by the coupling means and has a curved, helical edge portion, nozzle means for sensing the edge portion, and means defining a receiving opening which is opposite the nozzle and is connected with the amplifier.

The pneumatic amplifier can be arranged to be responsive to axial movement between the nozzle means and the edge portion from a certain relative axial position, the regulator unit further comprising a shifting means which is arranged to be operated by the amplifier in order to restore the relative axial position between the edge portion and the nozzle.

The vane can be mounted for rotation about its axis and the shifting means comprises a bellows.

In accordance with a preferred form of the invention the mounting means comprises a frame including two straps arranged behind the measuring instrument and connected wtih a front frame by means of screws. The regulator unit is mounted on the front frame by means of vertical screws so that the unit is coaxial with the measuring instrument.

Further details and advantages of the invention will appear from the following particular description referring to the attached drawings.

FIG. 1 of these drawings is an exploded view of the regulating means in cooperating the invention.

Figure 1:
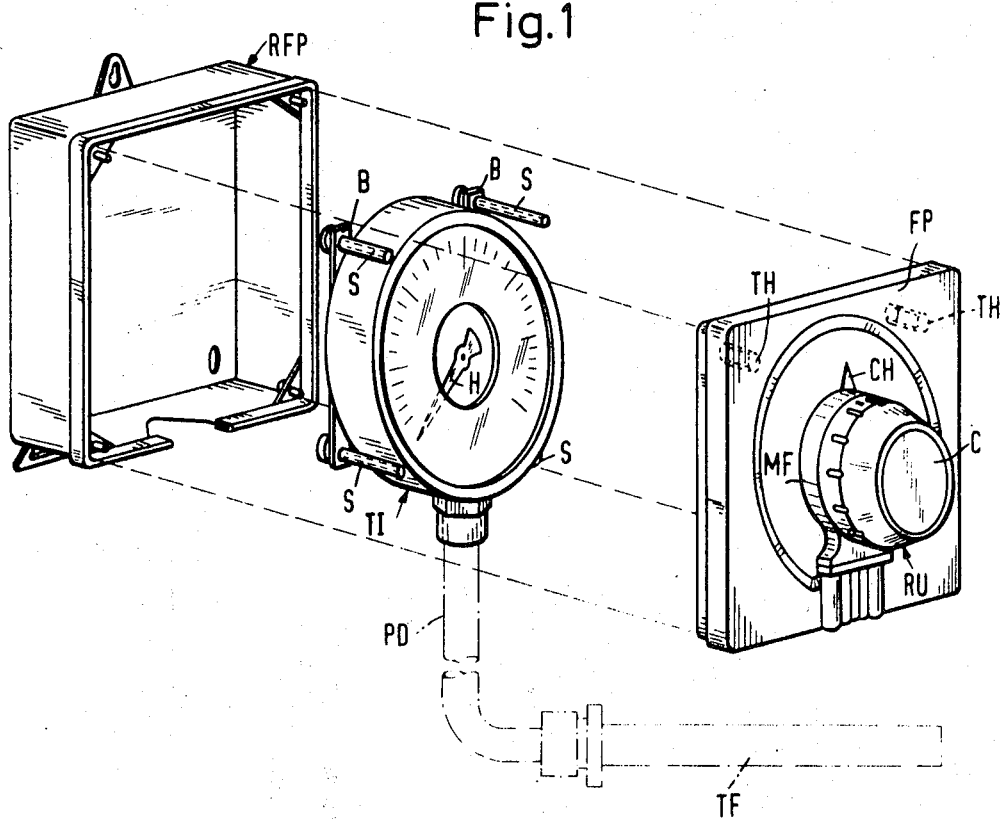

As shown in FIG. 1 the regulating means in accordance with the invention comprises a temperature indicating instrument TI which is of standard dimensions, that is to say its housing has specific dimensions adopted for other types of instruments such as pressure indicating instruments. The temperature indicating instrument is connected by means of a pressure duct PD with a temperature feeler TF located in some vessel whose temperature is to be controlled. For instance, this vessel can be an autoclave for carrying out a chemical reaction or heating a liquid, means for supplying heat being controlled by the regulating means in response to a pneumatically transmitted signal from a regulator unit RU arranged in front of the thermometer in a manner to be described. The regulator unit is responsive to changes in the position of a hand H of the instrument TI and the temperature which is to be maintained in the vessel by the use of the regulator unit can be set by means of a control hand CH forming part of the regulator unit and arranged so that it can be turned about the same axis as the hand H.

Figure 2:
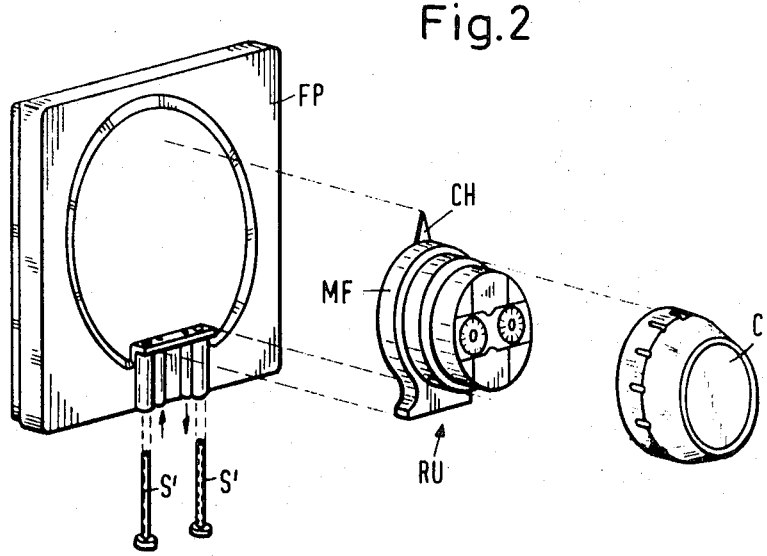
FIG. 2 is an exploded view of part of what is shown in FIG. 1.

The regulator unit has a cap C which is shown deteached in the exploded view of FIG. 2 and the part of the regulator unit inside the cap can be turned in a stationary mounting frame MF for setting hand CH.

The method of attachment of the regulator unit to the instrument TI is as follows, it being emphasized, again, that a principal purpose of the arrangement adopted is to enable the regulator unit to be mounted in combination with any measuring instrument such as a temperature gage or pressure gage of standard dimensions which may have been adopted in a country as a whole or within a particular industry. As shown more particularly in FIG. 2, the regulator unit is mounted by means of its mounting frame MF on a front frame plate FP by means of two vertical Allen screws S' which hold a base part of the mounting frame CH down onto a horizontal ledge so that two ducts opening at the bottom of the frame are held in engagement with two ducts in the front frame part. Pneumatic connections are then made with the bottom part of the front frame part for supplying compressed air to the regulator unit and for conveying away the pneumatic output signal of the unit which varies in pressure as a function of the position of the hand H of the instrument and the setting of the control hand CH. The front frame part has four rearwardly opening screw threaded holes TH into which screws S arranged around the periphery of the instrument TI are screwed. These screws have their heads resting against straps or bars B so as to hold the instrument against the back of the front frame part FP. The front frame part has an opening through which the face of the instrument may be seen. Its central part is covered over by the regulator unit. The front frame part is held in a rear frame part RFP in the form of a housing by means of four corner screws, not especially referenced but visible in the drawing, which may be turned by inserting a screw driver through rear holes at the corners of the rear frame part. The rear frame part is provided with means for mounting it on an upright surface.

The construction and operation of the regulator unit RU will now be described with reference to the diagrammatic drawing of FIG. 3, the specific details of construction being then described with reference to FIG. 4.

Figure 3:
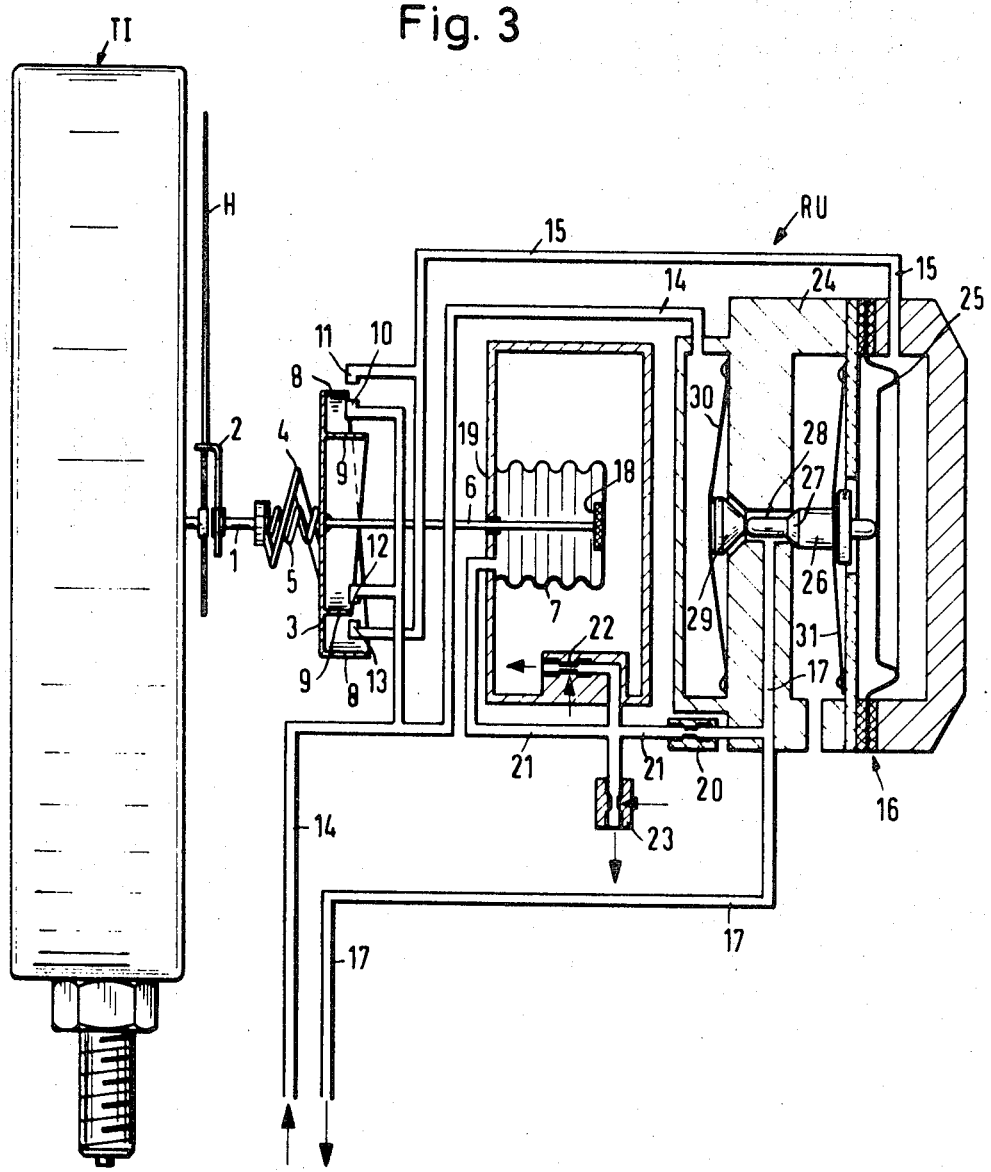
FIG. 3 is a diagrammatic vertical section of the regulating means in accordance with the invention.

On the left, FIG. 3 shows the temperature instrument TI with its circular housing and the hand or pointer H mounted on the driving shaft for rotation about the axis of the housing. The hand H cooperates with graduations in a scale on a dial in giving a reading. The shaft on which the hand H is mounted is driven in a customary manner by means behind the dial so as to respond to temperatures existing in the temperature feeler TF and transmitted by means of the pressure duct PD. In front of, and coaxial with, the shaft on which the hand H is mounted there is a shaft 1 which is caused to rotate with the hand by means of a coupling 2 which extends radially from the shaft 1 and engages the shank of the hand H at a point removed from the shaft on which the hand is mounted. The coupling is in the form of a fork and is provided with spring means for clipping the hand shank so as to prevent any backlash between the hand carrying shaft and the shaft 1. The right-hand end of shaft 1 is connected by two springs with a rotatable vane part 3. One spring 4 is in the form of a strip and is designed to prevent relative rotation between the shaft 1 and the vane part 3 while not transmitting axial forces between them, while the further spring 5 is a compression spring which is arranged to exert a thrust on the vane part 3. The vane part is connected with a further shaft 6 which is coaxial to shaft 1 and which is arranged to be moved by bellows 7 as will be described below. The vane part 3 comprises a radial disc-like part with two vanes 8 and 9 which are helical but of opposite hand. The vane 8 is arranged to pass between an air nozzle 10 and a receiving opening 11 so that the position of the vane will influence the pressure of air in the receiving nozzle 11. A similar arrangement is provided for cooperation with edge portion 9 and comprises a nozzle 12 and a receiving opening 13. Means, which are not shown, are provided for connecting only one nozzle and its cooperating receiving opening with pneumatic ducts in the regulator unit so that the other nozzle and receiving opening are not supplied with compressed air or provided with any outlet for a pressure signal from the receiving opening.

Since the vanes 8 and 9 are of opposite hand, rotation of the shaft 6 in one direction will tend to cause one vane to come further into the space between its nozzle and receiving opening while the other vane is moved out of the space between its nozzle and receiving opening.

The nozzles are arranged to be fed with air through a supply duct 14 in accordance with the connection established as mentioned above, that is to say either one nozzle or the other is supplied with compressed air but not both simultaneously. Air pressure from the one or the other receiving opening 11 or 13 is transmitted by a duct 15 to a pneumatic amplifier, generally indicated by reference numeral 16, and whose output duct is denoted by reference numeral 17.

For moving the shaft 6 with the vane part 3 in a horizontal direction along the axis of the shaft, I provide the metal bellows 7 which has a bearing 18 to which the right end of shaft 6 is fitted. The bearing 18 is air-tight so that air cannot escape from inside the bellows. Spring 5 holds the shaft 6 in engagement with the bearing. The interior space of the bellows is closed by a plate 19 in which there is an air-tight bearing for the passage of shaft 6. The plate 19 forms part of a housing which totally encloses the bellows 7.

There is a branch duct from the output duct 17 of the amplifier 16 which leads through a non-adjustable choke 20. From this choke 20 a duct 21 leads to the space inside the bellows 7. Duct 21 is connected by means of adjustable chokes 22 and 23 respectively with the inside of the means surounding the bellows and with the atmosphere.

The pneumatic amplifier comprises a housing 24 with a membrane 25 mounted in it so as to define a membrane chamber in the right-hand end of the housing. This membrane chamber is sealed and its only opening is via duct 15 connected with one or the other of the receiving openings 11 and 13. The membrane 25 is arranged to move a push rod 26 which carries a conical valve part 27 arranged to engage a seating at one end of a duct 28 in housing 24. The left-hand end of push rod 26 is arranged to open and close a valve part 29, which also cooperates with a seating in duct 28 and is acted upon by a strip spring 30. The push rod 26 is urged to the right by a strip spring 31 which is mounted in a chamber on the left of the membrane 25. This chamber is in free communication with the atmosphere. The space on the left-hand side of valve part 29 is connected with the air pressure duct 14 so that it is always held at the same pressure.

From one point of view the amplifier may be considered as having the function of maintaining the relative axial alignment between one or other of the nozzles 10 or 12 and the cooperating vane. Rotation of the vane part 3 will cause a change in the relative axial positions of the vane part and the nozzle so that movement of the vane part 3 using the bellows 7 is necessary to restore the axial alignment.

For this purpose the arrangement of the valve parts 27 and 29 and the cooperating seatings is such that movement of the membrane 25 to the left opens the left-hand end of the duct 28 thus admitting compressed air from duct 14, while simultaneously tending to close the right-hand end of duct 28. Further movement of the membrane 25 to the left will cause a further opening and closing respectively of the valve parts at the ends of duct 28 so that the pressure in the duct 17 will be increased.

The pressure in the chamber to the right of membrane 25 will be responsive to the pressure in one or other of the receiving openings 11 or 13, whichever is connected with the duct 15.

An increase in pressure in duct 17 will act through fixed choke 20 to increase pressure in duct 21. Owing to the presence of choke 22 which is arranged to perform an integrating function, the increase in pressure will be transmitted to the space inside the bellows 7 considerably more rapidly than to the space surrounding the bellows. As a result the bellows will be expanded and the shaft 6 with the vane part 3 will move to the right owing to the thrust of spring 5 which holds the right-hand end of shaft 6 against the bearing 18. As a result the vane 8 or 9 will be moved further into the space between the nozzle and the cooperating receiving opening so that the pressure in the receiving opening will be reduced.

The pressure signal will also be transmitted by pressure duct 17 as an output signal from the regulator unit for transmission to the controlled object in the form of an effective operating control signal. For instance, the output from duct 17 can be used for setting a valve controlling the flow of heating medium to the controlled object whose temperature is sensed by the temperature feeler TF.

The choke 23 has a proportional characteristic. By changing its setting the response of the regulator unit to a change in temperature can be set. This adjustment can be used to cut out hunting in the control system as a whole.

The regulator unit can be rotated as a whole about the axis of shaft 6 so that the relative positions between the nozzles and the vanes 8 and 9 are changed. The position of rotation is indicated by the control hand CH as shown in FIG. 1 and is used to set the value at which the temperature is to be held.

Figure 4:
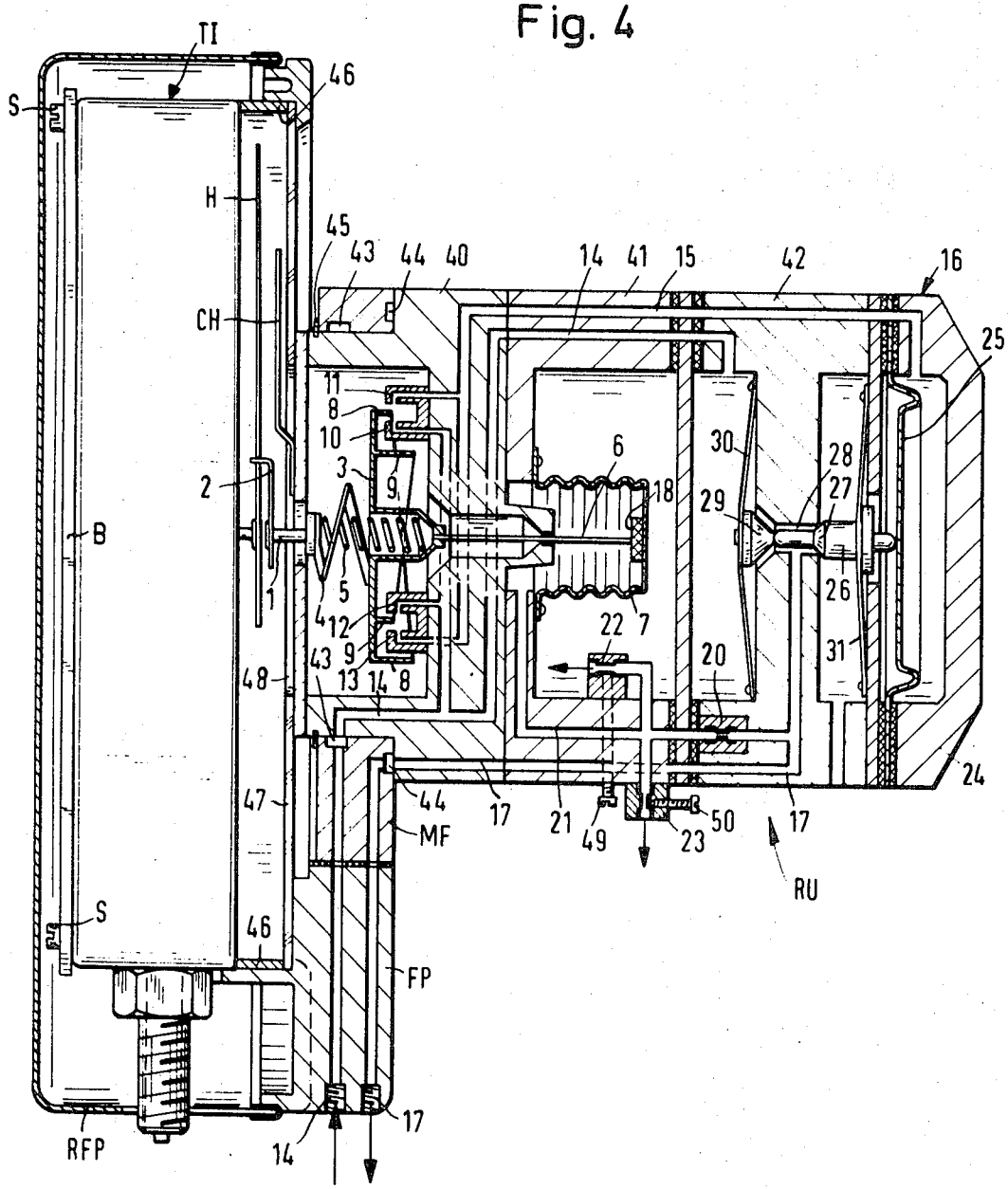
FIG. 4 is a detailed section of the regulating means.

Referring to the detailed drawing of FIG. 4, it will be seen that the housing of the regulator unit is made up of three main turned portions 40, 41, and 42 which are held together by screws parallel to the axis, that is to say parallel to the axis of shaft 6, which are not shown in the drawing. The housing parts are provided with suitable sealing means for insuring airtight connection of the ends of ducts in them.

The left-hand housing part 40 is arranged in the mounting frame MF which is in the form of a ring. Ducts 14 and 17 pass upwards through the front frame part FP and into the mounting frame. They lead into circular grooves 43 and 44 from which they are continued in the housing part 40. The parts of the ducts 14 and 17 in the housing part are always in communication with the grooves 43 and 44 irrespective of the position of rotation of the regulator unit. The rotatable part of the regulator unit, that is to say principally the part contained in the housing parts 40, 41, and 42, is held in the mounting frame by means of a retaining C-ring 45.

The means for connecting the one or the other nozzle 10 or 12 with the duct 14 and the cooperating receiving opening with the duct 15 are not shown. This means is constituted by an arrangement enabling part of the housing on which the nozzles and receiving openings are mounted to be rotated in relation to the rest of the housing part 40 so that the one or the other nozzle and receiving opening is connected with the ducts.

The temperature indicating instrument TI is held against the front frame part by the screws S so that the front of the instrument abuts against a ring 46 which holds in place a glass disc 47 with a central opening 48 through which the control hand CH and the coupling 2 can be inserted so that the one cooperates with the scale of the instrument while the other is clipped on the hand of the instrument.

The vane part 3 has a central tubular boss into which the compression spring 5 extends.

I claim:
1. An assembly comprising in combination:
   a measuring instrument with a dial, a housing supporting said dial, a shaft extending throught the dial, first transducing means behind the dial within said housing for transducing a signal physically transmitted from outside the housing into rotation of the shaft, and a hand fixed on the shaft for cooperation with a scale in giving a signal, and
   a regulator unit, detachable mounting frame means holding the unit in front of the dial, said regulator unit comprising a coupling for making contact with the hand of the instrument, means supporting the coupling so that it can rotate substantially coaxially with the shaft, and a second transducer means for producing a pneumatic output signal in accordance with rotation of the shaft for transmission to a load, a duct for supplying compressed power air to said second transducer means, and a duct for conveying pneumatic output signals produced by said second transducer means.

2. An assembly in accordance with claim 1 in which the second transducing means comprises a pneumatic amplifier, a vane which is arranged to be rotated by the coupling means and has a curved, helical edge portion, nozzle means for sensing the edge portion, and means defining a receiving opening which is opposite the nozzle and is connected with the amplifier.

3. An assembly in accordance with claim 2 in which the pneumatic amplifier is responsive to relative axial movement between the nozzle means and the edge portion from a certain relative axial position, the regulator unit further comprising a shifting means which is arranged to be operated by the amplifier in order to restore the relative axial position between the edge portion and the nozzle.

4. An assembly in accordance with claim 3 comprising a shaft on which the vane is mounted for rotation about the axis of the vane, and the shifting means comprising bellows, which is arranged to move the shaft along its axis.

5. An assembly in accordance with claim 4 in which both nozzles can be rotated about the axis of the vane in relation to the first transducing means.

6. An assembly in accordance with claim 5 in which the regulator unit can be turned in relation to the measuring instrument.

7. An assembly in accordance with claim 6 comprising means closing the inside and outside of the bellows, a loop of duct connecting the inside of the bellows with the outside of the bellows, a first choke in this loop, a duct and a second choke connecting this loop with the output of the amplifier, and a further choke connected with the loop on the same side of the first-mentioned choke as the connection with the second-mentioned choke, for allowing compressed air to escape from the loop at a controlled rate.

References Cited
UNITED STATES PATENTS

| | | | |
|---|---|---|---|
| 2,785,696 | 3/1957 | Le Van | 73—388 X |
| 2,884,940 | 5/1959 | Gorrie | 137—85 |
| 3,283,581 | 11/1969 | Du Bois et al. | 73—388 X |

LOUIS R. PRINCE, Primary Examiner

W. A. HENRY, Assistant Examiner

U.S. Cl. X.R.

137—83, 85; 236—82